INVENTOR.
WILLIAM A. RAY
BY
Flam and Flam
ATTORNEYS.

June 20, 1961

W. A. RAY 2,989,082

VALVE STRUCTURE HAVING ANGULARLY MOVABLE
SLIDE WITH SHEAR SEALS

Filed July 31, 1959

INVENTOR.
WILLIAM A. RAY
BY Flam and Flam
ATTORNEYS.

June 20, 1961

W. A. RAY 2,989,082

VALVE STRUCTURE HAVING ANGULARLY MOVABLE
SLIDE WITH SHEAR SEALS

Filed July 31, 1959

INVENTOR.
WILLIAM A. RAY
BY Flam and Flam
ATTORNEYS.

United States Patent Office

2,989,082
VALVE STRUCTURE HAVING ANGULARLY MOVABLE SLIDE WITH SHEAR SEALS
William A. Ray, North Hollywood, Calif., assignor to General Controls Co., a corporation of California
Filed July 31, 1959, Ser. No. 830,845
8 Claims. (Cl. 137—625.46)

This invention relates to valve structures, and particularly to those intended for the control of viscous fluid fuel, such as fuel oil.

Fuel oils as now marketed often include solid particles in suspension, sometimes in colloidal form. Such particles may be carbon and form a substantial constituent of the fuel.

Control of such viscous liquids by the usual form of ball valves or the like invariably causes serious deposits of solid gummy matter, obviously interfering with the proper opening and closing of the valve.

It is one of the objects of this invention to provide a valve structure that can function effectively with media such as viscous liquid hydrocarbon fuels without danger of rapid deterioration.

It is another object of this invention so to arrange those members that provide port passages as to be available for ready cleaning, while leaving the main parts of the valve in fully assembled position.

In order to accomplish these results, the valve is so constructed that the ports are formed in part by a removable cover member that when removed exposes the main valve closing elements.

It is still another object of this invention to provide a valve of simplified structure in which rigid shear seals are slidingly supported for lateral movement on a plane surface forming a ported valve seat, for opening and closing the valve, whereby an inherent seat cleaning effect is produced.

It is still another object of this invention to provide a slide valve structure that operates in an arcuate path over the valve seat surface, whereby the structure may be utilized to control flow between two openings corresponding to an inlet and an outlet or, alternatively, to control the flow from one inlet to any of a plurality of outlets.

This invention possesses many other advantages, and has other objects which may be made more clearly apparent from a consideration of one embodiment of the invention. For this purpose, there is shown a form in the drawings accompanying and forming part of the present specification. This form will not be described in detail, illustrating the general principles of the invention; but it is to be understood that this detailed description is not to be taken in a limiting sense, since the scope of this invention is best defined by the appended claims.

Referring to the drawings.

The valve structure includes a valve body 1 (FIGS. 1, 2 and 7) which may be made conveniently from a brass casting. This valve body 1 is provided with a threaded inlet opening 2 formed in a boss 4. A conduit 3 adapted to carry a fluid, such as a heavy fuel hydrocarbon, is threaded into the inlet.

Figure 2:
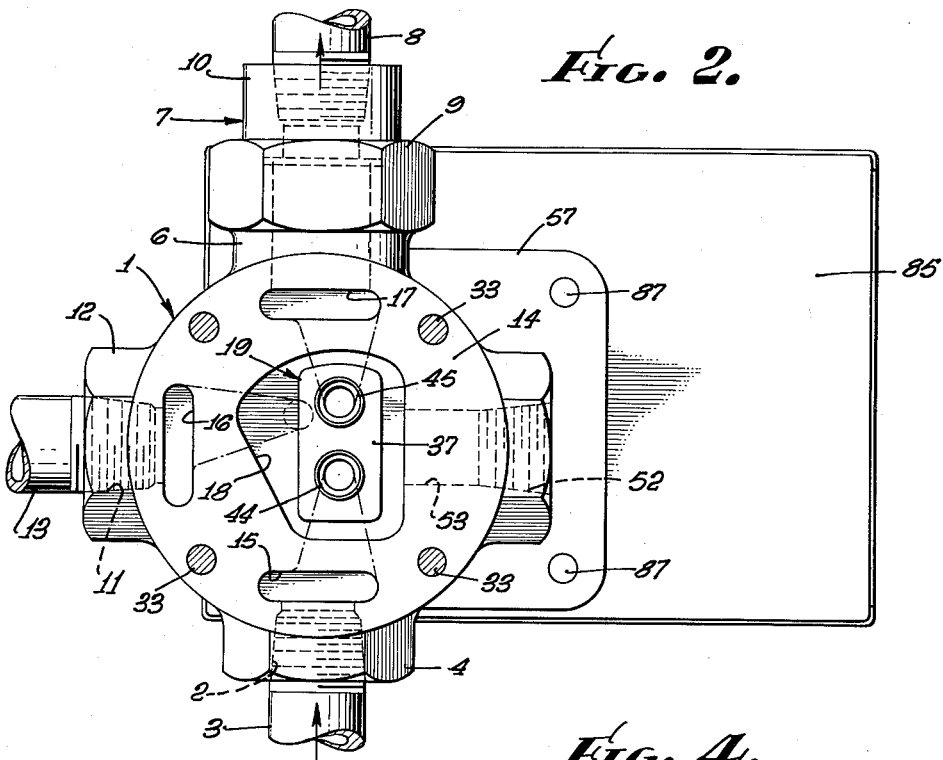
FIG. 2 is a sectional view, taken along a plane corresponding to line 2—2 of FIG. 1.
Figure 6:
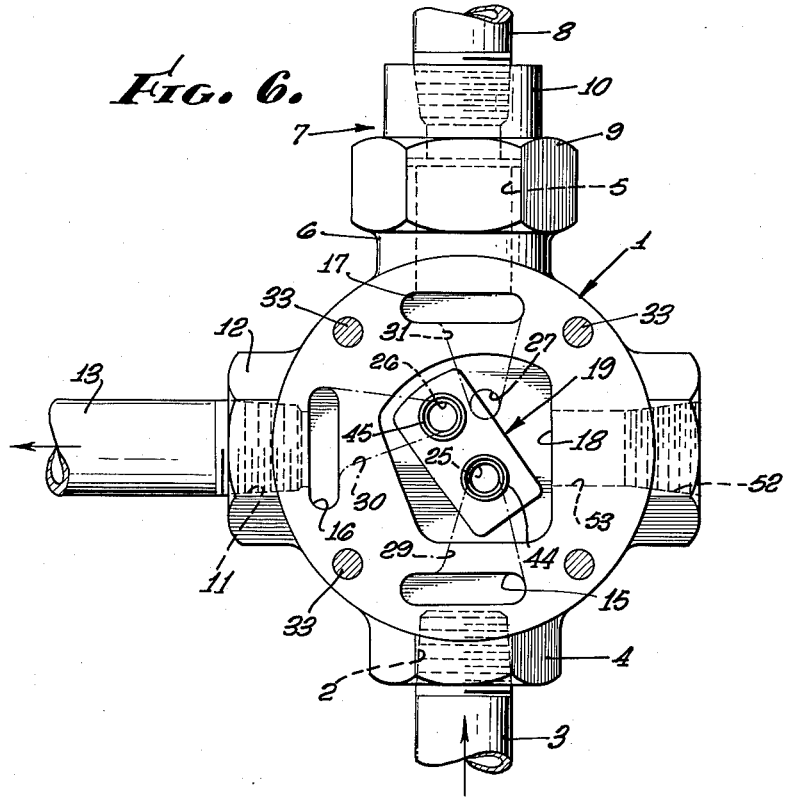
FIG. 6 is a view similar to FIG. 2 but illustrating an alternative position of the valving member.

The main portion of the valve body 1 is cylindrical, as illustrated most clearly in FIGS. 2 and 6, the inlet conduit 3 being substantially radial of the body 1 and extending through the enlarged boss 4 of hexagonal shape that is formed integrally with the body 1.

Diametrically opposite the inlet opening 2 is an outlet opening or aperture 5 which is also radially arranged through a threaded extension 6. This threaded extension 6 can be connected in any appropriate way, as by a coupling structure 7, to an outlet conduit 8. This coupling structure includes a flanged nut 9 and an internally threaded fitting 10 having a flange adapted to be urged downwardly against a gasket 10a by the nut 9.

Preferably a third opening 11 (FIGS. 2 and 6) is provided, displaced at right angles to the openings 2 and 5 and formed similarly to the opening 2. Thus, it may be threaded into an enlarged hexagonal boss 12 formed integrally with the body 1. Into this boss 12 may be threaded a second outlet conduit or pipe 13.

Figures 1, 3, 5:
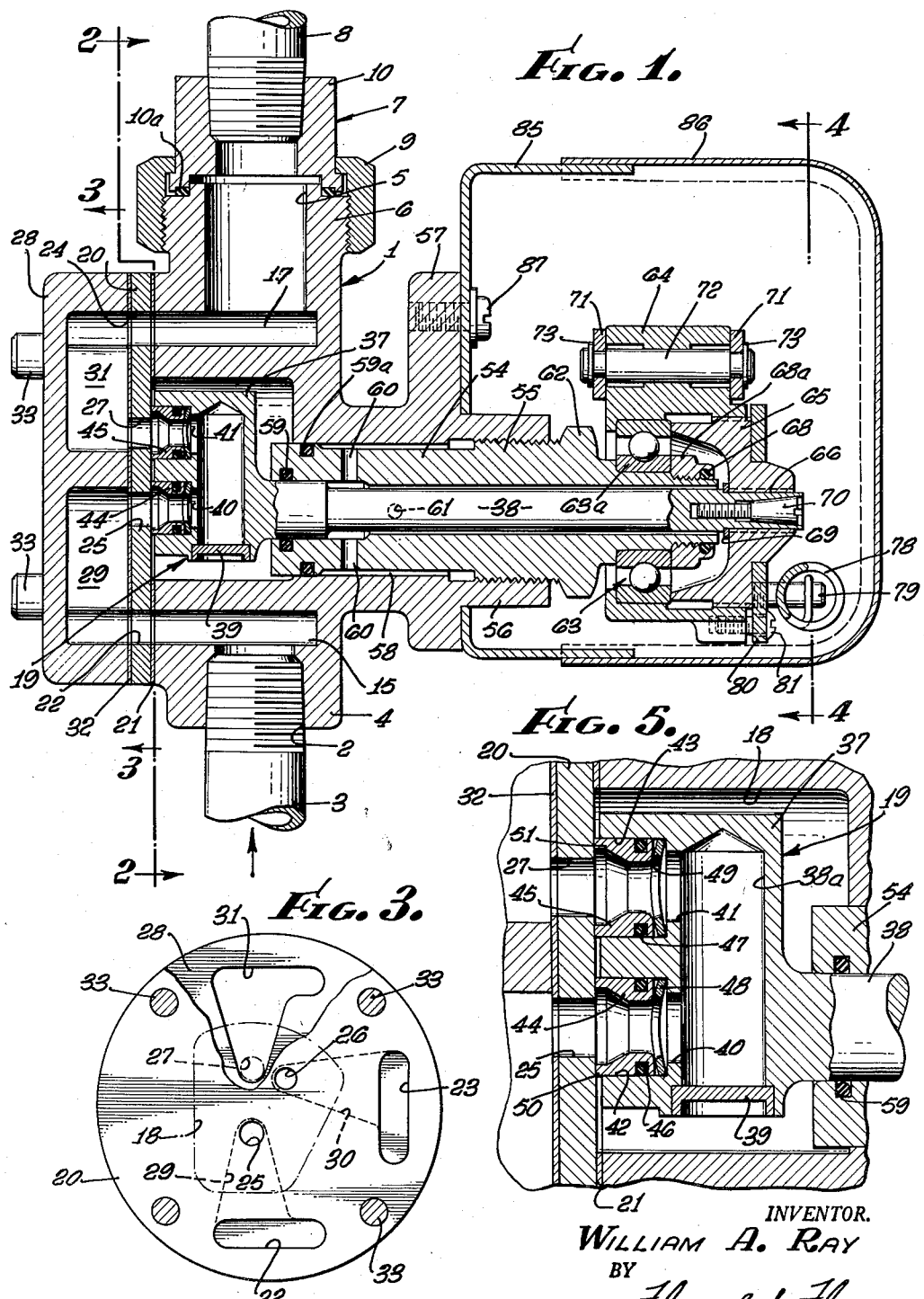
FIGURE 1 is a vertical longitudinal sectional view of a valve structure incorporating the invention.
FIG. 3 is a sectional view, taken along a plane corresponding to line 3—3 of FIG. 1.
FIG. 5 is a fragmentary enlarged sectional view showing the main elements of the valving member.

The body member 1 is provided with a plane surface 14 into which open the oval ports 15, 16 and 17. These ports, as shown most clearly in FIGS. 1 and 2, are in communication respectively with the openings 2, 11 and 5. Accordingly, in order to obtain a flow of fluid or liquid between the inlet opening 2 and either of the outlet openings 5 or 11, it is necessary to provide a continuous passageway between opening 2 and either of the other two outlets 5 or 11. How this is accomplished will now be described.

Opening in the body surface 14 is a recess 18. This recess 18 is arranged to accommodate a valving structure 19. This valving structure is shown to best advantage in FIG. 5.

This valving structure is intended to cooperate with a valve plate 20. As shown most clearly in FIG. 7, this valve plate may be of generally disk form provided with a number of apertures or ports, to be hereinafter described. It accurately overlies the plane surface 14, there being an appropriate gasket 21 interposed between the valve plate 20 and the surface 14.

The valve plate is provided with three through ports 22, 23 and 24 (FIGS. 1 and 3) registering respectively with the ports 15, 16 and 17 of the body 1. In addition, the valve plate has three through ports 25, 26 and 27 opening into the recess 18. One of these ports 25, as hereinafter described, is intended to be placed into communication with the inlet opening 2 via port 22; another port 26 is intended to be placed into communication with the outlet opening 11 via port 23; and a third port 27 is intended to be placed into communication with the outlet port 5 via port 24.

The centers of ports 26 and 27 are located on the arc of a circle having a center on the axis of port 25 (FIG. 3).

Figure 7:
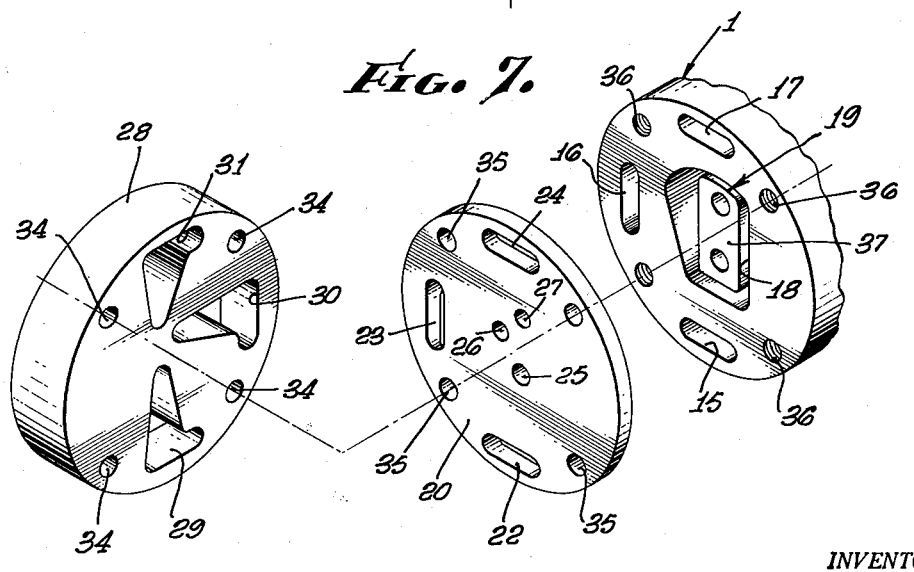
FIG. 7 is an exploded isometric view, mainly diagrammatic, of the valve plate and cover member which form important parts of the valve structure.

To complete the communication between the pairs of ports 22 and 25, 26 and 23, and 27 and 24, use is made of a cover member 28 having three recesses 29, 30 and 31 (FIGS. 1 and 7). Thus, the recess 29 establishes communication, as shown in FIG. 1, between the ports 22 and 25; similarly, recess 30 establishes communication between the ports 23 and 26; and lastly, the recess 31 establishes communication between ports 27 and 24. A gasket 32 is interposed between the cover member 28 and the valve plate 20, having openings therein corresponding to the opening edges of the recesses 29, 30 and 31. Machine screws 33 may be utilized to attach the elements 20, 21, 28 and 32 to the body 1. These screws can pass through appropriate openings 34 (FIG. 7) formed in the cover member 28 and through openings 35 in the plate 20 and are threaded into appropriate tapped apertures 36 in the body 1.

By the aid of the valving structure 19, the port 25 may be placed in communication with either of the ports 26 or 27. The structure 19 has a sliding motion on the valve plate 20. Structure 19 includes a block 37 mounted on the end of a shaft 38 having an axis corresponding to the axis of the port 25. The block 37 has an elongated aperture 38a (FIG. 5) which is closed by an appropriate plug 39. Transversely to this aperture 38a are ports 40 and 41 having counterbores 42 and 43. In these counterbores are mounted metal shear sealing members 44 and 45. These shear sealing members serve as seats for the valve, and each of them is provided with sealing O-rings 46 and 47. Spring washers 48 and 49 may be provided between the inner ends of the shear seals 44 and 45 to urge these seals or seats into sealing engagement with the adjacent surface of valve plate 20.

Each of the shear seals is provided with a relatively narrow edge 50 and 51. These edges, due to the wiping motion of the seals with respect to the valve plate 20, serve to keep the active surfaces of the plate in proper and clean condition.

In the angular position illustrated in FIG. 2, the inlet conduit 3 is placed in communication with the outlet conduit 8. In the position of FIG. 6, the shaft 38 has been rotated to establish communication between the inlet conduit 3 and the outlet conduit 13. This is provided for by an angular sliding movement of about 45° between the two positions of Figs. 2 and 6.

As thus far described, it is seen that in the event of fouling of any of the valve ports, it is a simple matter to remove the cover member 28 and the valve plate 20 to expose all of the ports in the body member 1, as well as in the plate 20 and cover member 28, as illustrated diagrammatically in FIG. 7. Cleaning of the ports is accordingly a simple matter.

In order further to prevent accumulation of solid or gummy matter in the recess 18, an opening is provided from this recess to the exterior of the valve structure. This is effected, for example, by a threaded aperture 52 (FIGS. 2 and 6) extending diametrically opposite the outlet 11 and having an unthreaded reduced portion 53 opening into the wall of the recess 18. If desired, a conduit can be threaded into the threaded portion of this opening 52.

The shaft 38 is received in a sleeve 54 (FIGS. 2 and 5). This sleeve in turn has a threaded enlarged portion 55 accommodated in the threaded boss 56 extending from a flange 57 connected to the body 1. A reduced intermediate portion of the sleeve 54 serves to provide an annular space 58 between the sleeve 54 and the body member 1. The sleeve 54 at its left-hand end provides a journal bearing for the enlarged left-hand portion of the shaft 38 which is shown in this instance as integrally formed with the block 37. A sealing O-ring 59 is disposed between bearing and the shaft 38. Another O-ring 59a is placed in an exterior groove on sleeve 54 to seal against the aperture accommodating this sleeve.

Any liquid inadvertently passing outwardly beyond the seal rings 59 and 59a may accumulate between the reduced part of the shaft 38 and the sleeve 54. However, it will find its way via apertures or ports 60 to the annular space 58, whence it may be expelled through a vent opening 61 formed in the body 1.

Figure 4:
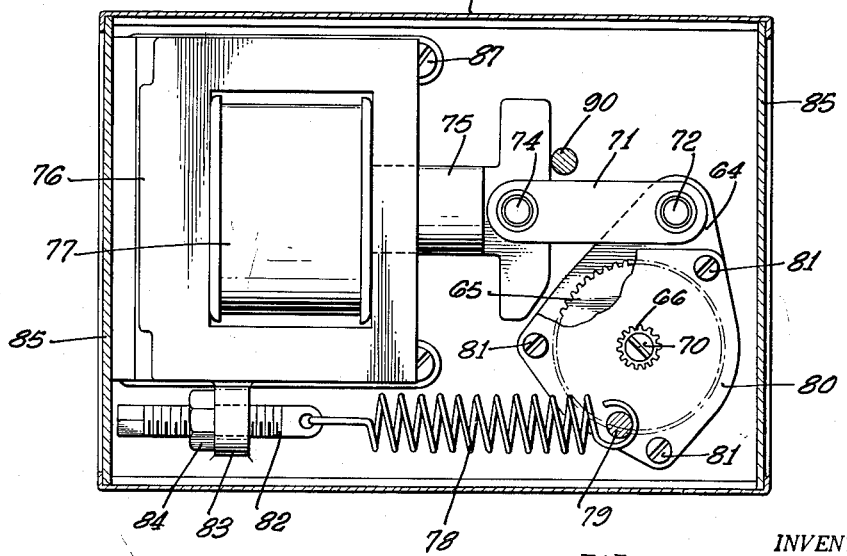
FIG. 4 is a sectional view, taken along a plane corresponding to line 4—4 of FIG. 1.

The sleeve 54 is provided with a hexagonal portion 62 to facilitate its assembly with the boss 56. The sleeve carries an extension providing a seat for the inner race 63a of a ball bearing structure 63. This inner race is held against a shoulder on the sleeve 54 by a nut 68a having a resilient sealing ring 68. This ball bearing structure has an outer race seated in a crank 64 (FIGS. 1 and 4). This crank is coupled to the shaft 38, as by the aid of a coupling member 65. This coupling member 65 has external splines interfitting internal splines formed in the bore of the crank 64.

The coupling member 65 in turn is splined in a similar manner to the reduced end 66 of the shaft 38. Accordingly, angular movement of the crank 64 results in angular movement of the shaft 38 and the block 37.

In order to limit axial movement of the coupling member 65, a spring ring 69 is provided engaging a groove in the reduced portion 66 of the shaft 38. A wedging screw 70 is threaded into an aperture in the right-hand end of the shaft 38 to expand this end of the shaft 38 into tight coupling relationship with the coupling member 65.

Any convenient actuator may be utilized for angularly moving the crank 64. For example, links 71 may be provided pivotally connected, as by a pin 72, to the crank 64. Spring rings 73 retain the pin 72 against removal.

The left-hand ends of the links 71, as shown in FIG. 4, are similarly pivoted, as by a pin 74, to the end of an electromagnet core 75. This electromagnet core cooperates with a magnetic frame 76 mounting a coil 77 for attracting the core 75 against the tension of an adjustable spring 78. This adjustable spring 78 is anchored, as by a pin 79, to a face plate 80 attached, as by screws 81, to the coupling member 65. Adjustment of the tension may be provided by the aid of an anchor member 82 received in an ear 83. The shank portion of the anchor 82 is threaded to receive an adjusting nut 84 engaging the ear 83.

The ear 83 may be appropriately provided within a casing or housing having two telescoping parts 85 and 86. The cover part 86 may readily be removed to gain access to the right-hand portion of the apparatus. The part 85 may be attached, as by screws 87, to the flange 57. It may be provided with an aperture for the passage of the boss 56.

A pin 90 (FIG. 4) limits rightward movement of core 75, and thereby the corresponding clockwise movement of shaft 54. Opposite movement is limited by limiting the inward travel of the core.

The inventor claims:

1. In a valve structure: a valve body having a pair of openings that correspond respectively to the inlet and outlet; said body having a surface in which a pair of ports open, and formed in the body, said ports respectively connecting to the inlet and outlet openings; said body having a recess also opening in said surface; a detachable valve plate overlying said surface so as to define the recess, and having ports respectively registering with said inlet and outlet ports, said valve plate having, as well, a pair of spaced ports opening into said recess; a detachable cover member overlying the valve plate and having passages respectively connecting the spaced ports to said inlet and outlet ports; a valving member in the recess and slidable with respect to the valve plate for optionally establishing and interrupting communication between said two spaced ports; and shear seals carried by the valving member and contacting that surface of the valve plate which is exposed in the recess.

2. In a valve structure: a valve body having a pair of openings that correspond respectively to the inlet and outlet; said body having a surface in which a pair of ports open, and formed in the body, said ports respectively connecting to the inlet and outlet openings; said body having a recess also opening in said surface; a detachable valve plate overlying said surface so as to define the recess, and having ports respectively registering with said inlet and outlet ports, said valve plate having, as well, a pair of spaced ports opening into said recess; a detachable cover member overlying the valve plate and having passages respectively connecting the spaced ports to said inlet and outlet ports; a valving member in the recess and slidable with respect to the valve plate for optionally establishing and interrupting communication between said two spaced ports; shear seals carried by the valving member and contacting that surface of the valve plate which is exposed in the recess; and shaft means for angularly moving the valve member so as to cause the valve member to assume either of its two positions.

3. In a valve structure: a valve body having three openings, one of which corresponds to the inlet, and the other two to outlets; said body having a surface in which three ports open, and formed in the body, said ports respectively connecting to the three valve body openings; said body having a recess also opening in said surface; a detachable valve plate overlying said surface to define a boundary of the recess, and having three ports respectively registering with the three ports that open in said surface, said valve plate having three spaced ports opening into said recess; a detachable cover member overlying the valve plate and having passages respectively connecting the three spaced ports to the three ports that open in said surface; and a valving member in the recess and slidable with respect to the valve plate for optionally establishing communication between that valve plate port in communication with the inlet opening to either of the other valve plate ports which are in communication with the outlet openings.

4. In a valve structure: a valve body having three openings, one of which corresponds to the inlet, and the other two to outlets; said body having a surface in which three ports open, and formed in the body, said ports respectively connecting to the three valve body openings; said body having a recess also opening in said surface; a detachable valve plate overlying said surface to define a boundary of the recess, and having three ports respectively registering with the three ports that open in said surface, said valve plate having three spaced ports opening into said recess; a detachable cover member overlying the valve plate and having passages respectively connecting the three spaced ports to the three ports that open in said surface; a valving member in the recess and slidable with respect to the valve plate for optionally establishing communication between that valve plate port in communication with the inlet opening to either of the other valve plate ports which are in communication with the outlet openings; and shear seals carried by the valving member and contacting that surface of the valve plate which is exposed in the recess.

5. In a valve structure: a valve body having three openings, one of which corresponds to the inlet, and the other two to outlets; said body having a surface in which three ports open, and formed in the body, said ports respectively connecting to the three valve body openings; said body having a recess also opening in said surface; a detachable valve plate overlying said surface to define a boundary of the recess, and having three ports respectively registering with the three ports that open in said surface, said valve plate having three spaced ports opening into said recess; a detachable cover member overlying the valve plate and having passages respectively connecting the three spaced ports to the three ports that open in said surface; a valving member in the recess and slidable with respect to the valve plate for optionally establishing communication between that valve plate port in communication with the inlet opening to either of the other valve plate ports which are in communication with the outlet openings; shear seals carried by the valving member and contacting that surface of the valve plate which is exposed in the recess; and shaft means for angularly moving the valve member so as to cause the valve member to assume either of its two positions.

6. In a valve structure: a valve body having an external plane surface into which an inlet and an outlet port open, said body having a recess also opening in said surface; a detachable valve plate disposed on said surface and overlying the recess to form a space bounded by the valve plate and the recess; said valve plate having ports respectively registering with said inlet and outlet ports; said valve plate having as well, a pair of spaced ports opening into the recess; a detachable cover member having a surface overlying the valve plate and having passages respectively connecting the spaced ports to said inlet and outlet ports; and a valving member having ports and located in the recess and slidable over the inner surface of the valve plate for optionally establishing and interrupting communication between said two spaced ports.

7. In a valve structure: a valve body having an external plane surface into which an inlet and an outlet port open, said body having a recess also opening in said surface; a detachable valve plate disposed on said surface and overlying the recess to form a space bounded by the valve plate and the recess; said valve plate having ports respectively registering with said inlet and outlet ports; said valve plate having as well, a pair of spaced ports opening into the recess; a detachable cover member having a surface overlying the valve plate and having passages respectively connecting the spaced ports to said inlet and outlet ports; a valving member having ports and located in the recess and slidable over the inner surface of the valve plate for optionally establishing and interrupting communication between said two spaced ports; the valving member being at all times clear of the wall of the recess; and means forming a passage from the recess to the exterior of the valve structure.

8. In a valve structure: a valve body having an external plane surface into which an inlet and an outlet port open, said body having a recess also opening in said surface; a detachable valve plate disposed on said surface and overlying the recess to form a space bounded by the valve plate and the recess; said valve plate having ports respectively registering with said inlet and outlet ports; said valve plate having as well, a pair of spaced ports opening into the recess; a detachable cover member having a surface overlying the valve plate and having passages respectively connecting the spaced ports to said inlet and outlet ports; a valving member having ports and located in the recess and slidable over the inner surface of the valve plate for optionally establishing and interrupting communication between said two spaced ports; shear seals slidingly mounted in the valving member ports and contacting the valve plate; and resilient means urging the seals against the valve plate.

References Cited in the file of this patent

UNITED STATES PATENTS

| | | |
|---|---|---|
| 795,911 | Hall | Aug. 1, 1905 |
| 928,588 | Cornish | July 20, 1909 |
| 2,477,590 | Ferwerda et al. | Aug. 2, 1949 |
| 2,528,272 | Gilman | Oct. 31, 1950 |
| 2,653,003 | Overbeke | Sept. 22, 1953 |